(No Model.)
T. H. BUTLER, G. W. EARHART & W. M. CRAWFORD.
METHOD OF PREPARING DOUGH.
No. 262,888. Patented Aug. 15, 1882.
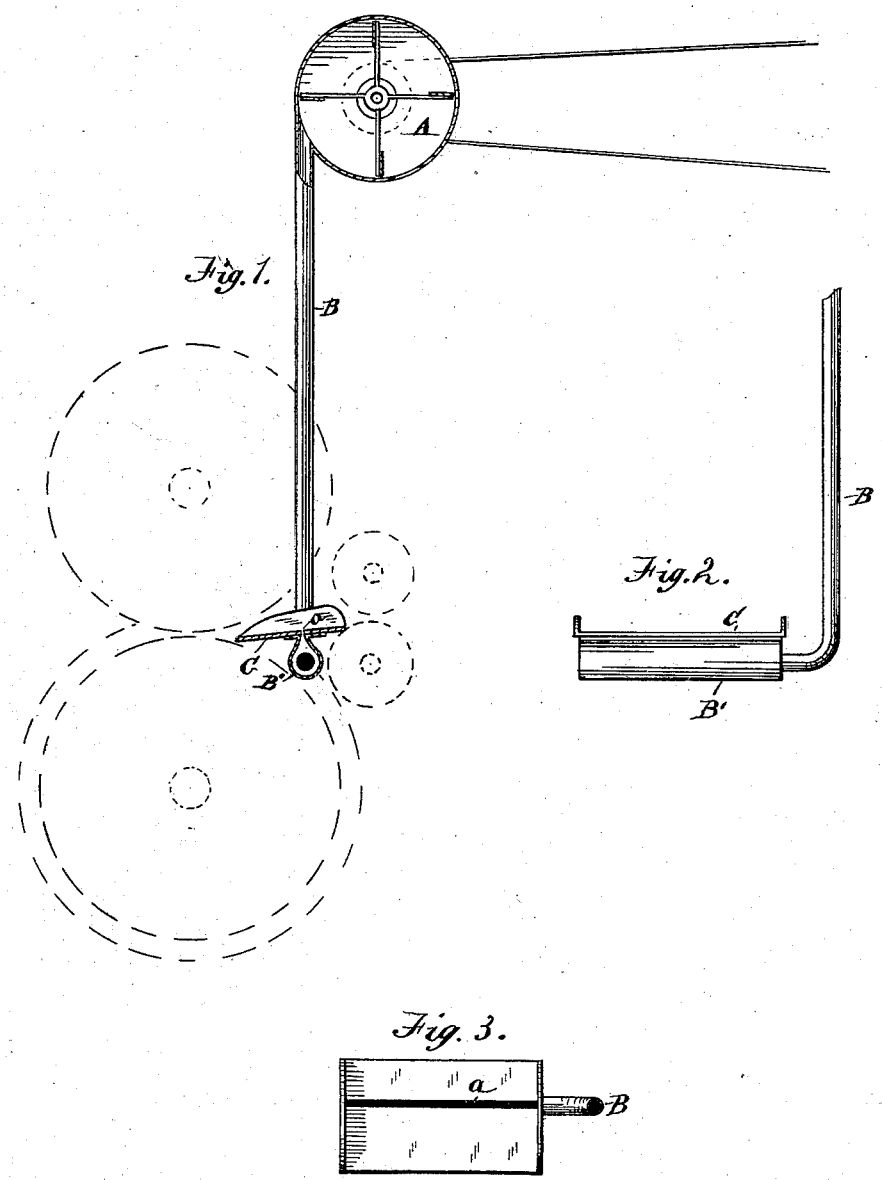
WITNESSES:
F. H. Knight
Harry Bernhard
INVENTORS
Theo. H. Butler
Geo. W. Earhart
Wm. M. Crawford
by Edson Bros. Attorneys

UNITED STATES PATENT OFFICE.

THEODORE H. BUTLER, GEORGE W. EARHART, AND WILLIAM M. CRAWFORD, OF COLUMBUS, OHIO.

METHOD OF PREPARING DOUGH.

SPECIFICATION forming part of Letters Patent No. 262,888, dated August 15, 1882.

Application filed June 26, 1882. (No model.)

*To all whom it may concern:*

Be it known that we, THEO. H. BUTLER, GEO. W. EARHART, and WM. M. CRAWFORD, (composing the firm of Butler, Earhart & Co.,) citizens of the United States, residing at Columbus, in the county of Franklin and State of Ohio, have invented certain new and useful Improvements in Methods of Preparing Dough; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a process of treating dough in its plastic state just prior to receiving action of dies for its conversion into the shape in which it is intended to bake it for use—as, for instance, in the shape of bretzels, crackers, jumbles, or other form—by subjecting it, after it has left the rolls which prepare the dough for the cutters or dies, to a blast or current of air, which has the effect to "skiff" it, by which term is meant to impart a surface to the dough that will prevent it adhering or sticking to the dies, avoiding an expense and annoyance heretofore experienced. Of course this sticking action of the dough is due to the presence in the latter of the property of adhesion and the absence of an intermediate counteracting agent—as, for instance, flour—between the dough and the face of the dies, which it is the purpose of our invention to supply.

In carrying out our invention we employ, in connection with a dough-feeding table of a machine adapted to stamp out the dough into the intended shape for baking, an air-blast device or blower connected to the table and capable of subjecting the dough passed over the table to the blast or current of air. To treat the opposite surface of the dough, as the above is adapted for treating only the lower surface thereof, it is only necessary to duplicate the aforesaid devices or supply other suitable device.

To enable a better understanding of our invention, reference is had to the accompanying drawings, in which—

Figure 1 is a sectional elevation of an apparatus or device that may be adapted for carrying out our invention. Fig. 2 is a side view of the dough-feeding table. Fig. 3 is a plan view of the same.

A is a blast apparatus or rotary fan or blower, suitably located, and having a pipe, B, leading to the under side of the dough-feeding table C. This table is arranged a little below a plane passing horizontally between the die-carrying cylinders or other surfaces of the stamping-machine, upon which the bretzel, jumble, cracker or other article is stamped out of the dough fed thereto from the table. Through this table is made a transverse slot, $a$, extending almost from side to side of the table. The lower end of the pipe B enters a chamber, B', affixed to the under side of the table in line with said slot. From this it will be seen that the blast or current of air from the fan will be passed through the pipe B up through the slot of the table and into contact with the surface of the dough.

We have practically demonstrated that the subjection of dough to a blast or current of air has the effect to form a film or skin thereon, which prevents its sticking or adhering to the dies or cutters.

In carrying out our method of treating dough other devices than those described may be employed for creating and conducting the blast to the dough, we having shown one way for its accomplishment.

Having thus described our invention, we claim and desire to secure by Letters Patent—

The described process for treating dough, which consists in passing a blast or current of air into contact with the dough prior to feeding it between dies or pressing dies thereon, substantially as and for the purpose set forth.

In testimony whereof we affix our signatures in presence of two witnesses.

THEODORE H. BUTLER.
GEORGE W. EARHART.
WILLIAM M. CRAWFORD.

Witnesses:
R. B. SMITH,
C. R. THOMPSON.